June 18, 1968 J. A. RUETZ 3,389,291

OSCILLATION SUPPRESSION MEANS FOR HIGH FREQUENCY ELECTRON DISCHARGE DEVICES INCORPORATING TRAVELING WAVE TUBE PORTIONS

Filed April 30, 1965

INVENTOR.
JOHN A. RUETZ
BY Wm. J. Nolan
ATTORNEY

United States Patent Office 3,389,291
Patented June 18, 1968

3,389,291

OSCILLATION SUPPRESSION MEANS FOR HIGH FREQUENCY ELECTRON DISCHARGE DEVICES INCORPORATING TRAVELING WAVE TUBE PORTIONS

John A. Ruetz, Los Altos, Calif., assignor to Varian Associates, Palo Alto, Calif., a corporation of California Filed Apr. 30, 1965, Ser. No. 452,158
10 Claims. (Cl. 315—3.6)

ABSTRACT OF THE DISCLOSURE

A helical slow wave circuit for use in traveling wave amplifier tubes. A series of notches cut into the helix provide a stop band at frequencies where backward wave oscillations are likely to occur. The notches are cut only in a central portion of the helix and the depth of the notches is tapered so that the depth decreases in a direction away from the center of the helix, with the result that spurious oscillations at the edges of the stop band are suppressed.

This invention relates in general to high frequency electron discharge devices of the traveling wave type and more particularly to novel oscillation suppression means for such devices.

Spurious or undesired oscillations in microwave traveling wave tube electron discharge devices are an ever present problem to the tube designer of such devices and solutions for such spurious oscillations are constantly being sought. U.S. Patent 3,200,286, issued Aug. 10, 1965, by William L. Rorden and assigned to the same assignee as the present invention presents a novel oscillation suppression technique involving a helical slow wave structure utilized in a traveling wave tube amplifier device.

The oscillation suppression technique of the Rorden application involved a periodic perturbation of the physical dimensions of the helical slow wave interaction circuit along the active circuit length of the helix. The spacing between the perturbations determined the stop band frequency created by the perturbations. The perturbations were so spaced such as to create a stop band at any frequency where backward wave oscillations presented a problem in a forward wave traveling wave tube amplifier. Experimental and theoretical analysis has indicated that such a stop banding technique as taught in the Rorden application is adequate for introducing a stop band in the passband of the circuit where backward wave oscillations are a problem. However, it has been determined that an additional problem is introduced by the introduction of the stop band, namely the existence of upper and lower band edge regions of low and zero group velocities which introduce the problem of band edge oscillations occurring at the band edges of the stop band created by the perturbations.

The present invention involves an advancement of the backward wave oscillation suppression technique disclosed in the aforementioned Rorden patent and results in considerable improvements with respect thereto with regard to band edge oscillations as well as reflection oscillations due to energy reflections caused by the perturbations of the slow wave circuit which are introduced to create the stop band. In essence then, the present invention might be stated to involve the concept of introducing a stop band within the operating passband of a slow wave circuit in order to minimize spurious oscillations in the frequency band covered by the stop band whle simultaneously preventing or greatly decreasing band edge oscillations occurring at the band edges of the stop band. The present invention further includes means for minimizing power reflections due to the introduction of the stop band at frequencies other than the stop band in order to eliminate regenerative oscillation problems.

It is to be noted that the band edge oscillation suppression techniques as applied to the band edge portions of the stop band as taught by the present invention with regard to the notched helix stop band circuit are equally applicable to other stop band techniques. For example, see U.S. Patent No. 2,809,321 and U.S. Patent No. 2,822,501 for other stop banded techniques which may be improved with regard to band edge oscillations by employing the techniques of the present invention with regard to limiting the stop banded region to only a portion of the active circuit length to thereby increase the start oscillation current for band edge oscillations for the stop banded region.

Although the concepts of the present invention are particularly embodied in the helix type of slow wave circuit, it will be appreciated by those skilled in the art that they are equally applicable to other types of slow wave circuits wherein oscillation suppression techniques are to be employed in order to increase the stability of traveling wave tube devices utilizing such slow wave circuits.

It is therefore an object of the present invention to provide combined stop band and band edge oscillation suppression means in traveling wave tubes operable in the microwave spectrum.

A feature of the present invention is the provision of a high frequency electron discharge device including a slow wave interaction circuit disposed along at least a portion of the central beam axis of said device wherein said slow wave interaction circuit incorporates means for introducing a stop band within the operating passband, said means for producing said stop band disposed along only a portion of an active circuit length of said slow wave interaction circuit.

Another feature of the present invention is the provision of a high frequency electron discharge device incorporating a slow wave interaction circuit disposed along the central axis of said electron discharge device, means for introducing a stop band in the lowest order pass band of said slow wave interaction circuit in the intermediate portions of said lowest order pass band, said stop band means extending along only a portion of the total active circuit length of the slow wave interaction circuit whereby the start oscillation current for band edge oscillations at the band edges of said stop band is increased over the entire active circuit length.

Another feature of the present invention is the provision of a high frequency electron discharge device incorporating a slow wave interaction circuit extending along at least a portion of the axial extent of said device, said slow wave circuit being a helix, said helix having a plurality of discrete notched regions spaced along the center portion of an active circuit length of said helix, said notched region being adapted and arranged so as to present minimum impedance discontinuities at the end portions thereof and maximum impedance discontinuities at the center portion thereof whereby electromagnetic energy reflections from said notched region are minimized at frequencies within the pass band of said slow wave interaction circuit external to the stop band introduced by said notched region.

Another feature of the present invention is a microwave traveling wave tube adapted and arranged to function as a forward wave amplifier through the mechanism of an energy exchange between an electron beam traveling along a slow wave interaction circuit in energy exchange relationship with a traveling electromagnetic wave propagating on said slow wave interaction circuit said tube incorporating means for introducing a stop band in the intermediate portion of the lowest order pass band of said slow wave interaction circuit at a frequency where backward wave oscillations occur, said stop band existing over only a portion of the active circuit length of said slow wave interaction circuit.

These and other features and advantages of the present invention will become more apparent upon a perusal of the following specification taken in conjunction with the accompanying drawing wherein.

Figure 1:
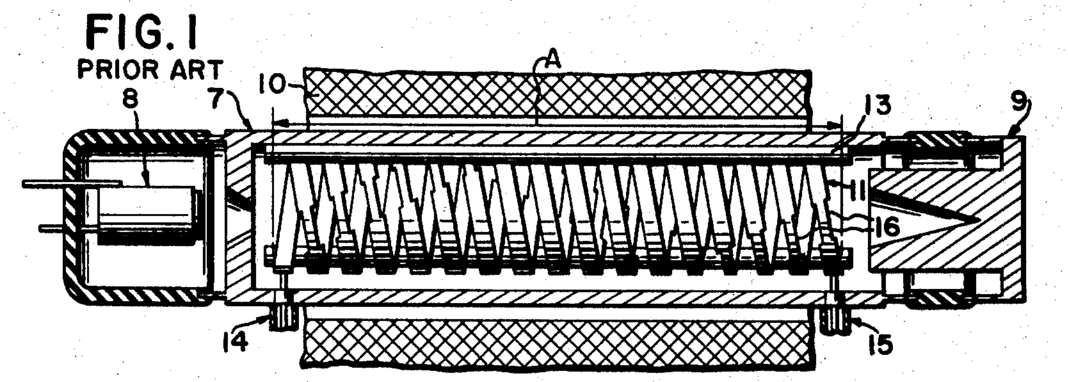
FIG. 1 depicts a longitudinal cross-sectional view partly in elevation of a high frequency traveling wave tube amplifier incorporating a stop band mechanism of the prior art.

Referring now to FIG. 1 there is depicted an elongated cross-sectional view partly in elevation of a typical high frequency traveling wave tube electron discharge device 7 suitable for operation in the microwave spectrum incorporating a beam forming and projecting means 8 disposed at the upstream end portion thereof and a beam collector 9 disposed at the downstream end portion thereof. Since the prior art is replete with electron guns such as the Pierce gun, etc., suitable for utilization as a beam forming and projecting means 8, further elaboration on the details of such a structure is not warranted herein. The traveling wave tube 7 depicted in FIG. 1 incorporates a suitable solenoid 10 denoted in fragment surrounding the intermediate portion of the device and adapted and arranged to provide magnetic focusing along the axial extent of the device in a conventional manner. See for example the aforementioned U.S. Patent 3,200,286 by William L. Rorden for greater details of typical construction techniques utilized in traveling wave tube amplifiers.

For purposes of definition the terminology slow wave circuit will be utilized in a generic sense to include structures adapted and arranged to propagate a traveling electromagnetic wave at a speed less than the velocity of light. Or to put it another way, any structure capable of propagating an electromagnetic wave such that the electromagnetic wave has a phase velocity less than the velocity of light according to well known techniques. The prior art traveling wave tube depicted in FIG. 1 incorporates a helix 11 slow wave interaction circuit constructed of any suitable material such as a molybdenum or tungsten tape disposed along the axial extent of the traveling wave tube and supported within a conductive shell 12 by means of a plurality of dielectric rods 13 in a known manner. Since the traveling wave tube depicted in FIG. 1 is adapted and arranged to function as an amplifier, it includes a suitable input means for electromagnetic energy such as coaxial line 14 and a suitable output means for electromagnetic energy, such as coaxial line 15, each of which is coupled to the helix in a conventional manner. The traveling wave tube depicted in FIG. 1 incorporates a notched helix designed according to the techniques described in the aforementioned U.S. Patent 3,200,286 for purposes of eliminating backward wave oscillations.

Figure 2:
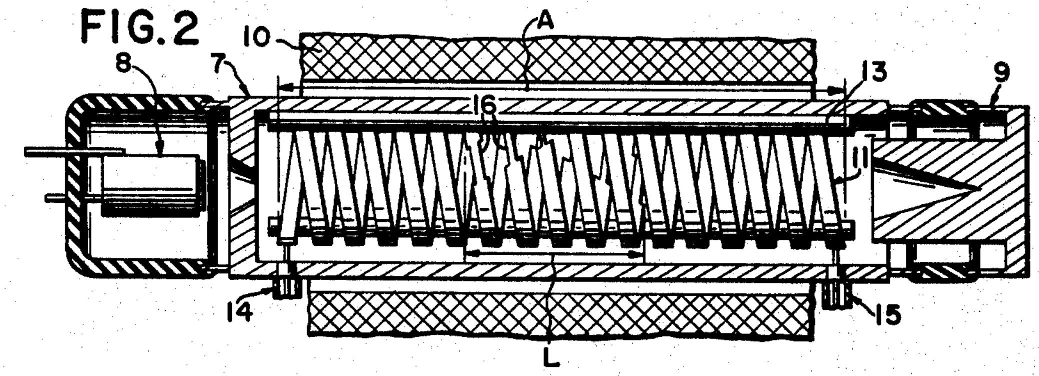
FIG. 2 is a longitudinal cross-sectional view partly in elevation of a traveling wave tube such as depicted in FIG. 1 incorporating the combined stop band and band edge oscillation suppression techniques of the present invention.

In FIG. 2 a high frequency traveling wave tube electron discharge device incorporating the novel oscillation suppression mechanism of the present invention and structurally identical to the schematic representation depicted in FIG. 1 is shown. Since the only deviation with regard to the structures depicted in FIGS. 1 and 2 is with regard to the oscillation suppression means, the reference numerals applicable to FIG. 1 are also applicable to FIG. 2. For purposes of definition, the terminology traveling wave tube will be applicable to any high frequency electron discharge device incorporating a slow wave circuit portion wherein an energy exchange takes place between a traveling electromagnetic wave and an electron beam traveling along the axial extent thereof. This definition includes hybrid tubes which incorporate a traveling wave section combined with a klystron section. This definition also includes traveling wave tubes incorporating field free regions such as circuit severs.

A traveling wave tube incorporating a helix such as depicted in the prior art FIG. 1 operating as a forward wave amplifier is susceptible to backward wave oscillations at frequencies where the beam velocity is approximately synchronous with the lowest order fundamental backward wave space harmonic which of course leads to a non-stable amplifier. Various techniques have been introduced and taught by the prior art for suppressing such backward wave oscillations, see for example the aforementioned U.S. Patent 3,200,286. The technique for backward wave oscillation suppression taught by said application involves introducing a plurality of notches along the axial extent of the slow wave interaction circuit, helix 11, between the upstream and downstream end portions thereof, said notches being spaced along the helix a distance corresponding to the electrical wavelength of the frequency corresponding to that frequency where the beam velocity is approximately synchronous with the lowest order fundamental backward wave space harmonic of the circuit. These backward wave oscillations become particularly troublesome at frequencies near Ka=½ where $$Ka=\frac{2\pi fa}{c}$$

wherein $f$ is frequency, $a$ is average circuit radius, and $c$ is the velocity of light since synchronism of the beam with the lowest order fundamental backward wave space harmonic occurs at this frequency. Therefore, it can be concluded that the notches 16, when properly spaced along the axial extent of the slow wave circuit as shown in FIG. 1, are useful means for eliminating backward wave oscillations in traveling wave tubes such as shown in FIG. 1. Experimental and theoretical analysis of tubes incorporating the stop banding techniques such as depicted in FIG. 1 have shown, however, that oscillations are still occurring in the vicinity of the stop band when a stop band technique such as depicted in the embodiment of FIG. 1 is utilized. Therefore, through theoretical analysis it has been concluded that the spurious oscillations resulting from the utilization of a stop banding technique such as depicted in the embodiment of FIG. 1 have been caused by what may be termed band edge oscillations occurring at the upper and lower band edges of the stop band. A clear portrayal of the rationale for such band edge oscillations will be presented hereinafter with reference to FIGS. 4 and 5.

Figure 3:
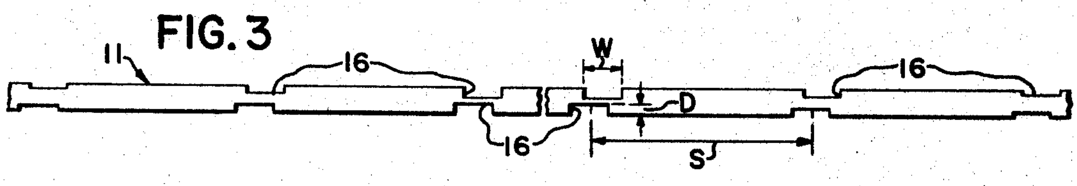
FIG. 3 is an enlarged elevational view of a tape helix suitable for utilization in the embodiment depicted in FIG. 2 incorporating notched perturbations constructed according to the present invention.

Turning now to FIG. 2 and the traveling wave tube depicted therein incorporating the oscillation suppression techniques of the present invention, it is seen that the stop banded region has been restricted to a small portion of the total active circuit length, region A, and disposed at approximately the center portion of the active circuit length, namely the region denoted L. The restriction of the stop banded portion to only a portion of the total active circuit length A such as region L has resulted in an increase of the starting current for band edge oscillations at the band edges of the stop bands by a greatly increased amount over what is obtained if the complete circuit is stop banded. This concept effectively eliminates any tendency for band edge oscillations at the band edges of the stop band for the selected operating beam current. In order to prevent electromagnetic energy reflections from the stop banded region at frequencies other than the frequencies within the stop band itself and thus prevent regenerative oscillations at these frequencies, the impedance discontinuities presented by the notches 17 in the stop banded region are tapered between the center portion of the stop banded region and the end portions thereof as best seen in FIG. 3, wherein a fragmentary portion of the stop banded region of the helix 11 is depicted. It is to be noted that the depth denoted D of each notch primarily determines the magnitude of the impedance discontinuity introduced by each notch while the effective stop banded frequency and the particular spectrum to be covered by the stop band is a function of both the width and the depth of the notch regions and primarily the spacing therebetween as pointed out in more detail in the aforementioned U.S. Patent 3,200,286 and the same design criteria apply herein. Similarly, it is to be noted that the pitch of the stop band notches, areas of non-uniform cross-section deviates from the helix pitch as taught in the Rorden application with regard to backward wave oscillation suppression. The present invention teaches a further advantage with regard to minimizing spurious oscillations in traveling wave tubes incorporating stop banded regions such as depicted in FIG. 2, namely, utilization of impedance tapering. As seen in FIG. 3, the impedance discontinuity presented at the center portion of the stop banded region is much greater than that presented at the end portions and this is achieved by simply reducing the depth dimensions D of the notched regions progressively toward the end portions of the stop banded region. This technique eliminates or minimizes reflected energy from the traveling electromagnetic wave at frequencies external to the stop banded region thereby decreasing the tendency for regeneration effects and increasing the efficiency of the traveling wave tube in the chosen mode of operation.

The preferred embodiment of FIG. 2 discloses a stop banded region which is disposed at approximately the center region of the slow wave circuit, however, it is to be noted that the teachings of the present invention are not to be so restricted since quite obviously the stop banded region could be introduced at other than the center regions of the slow wave circuit.

Figure 4:
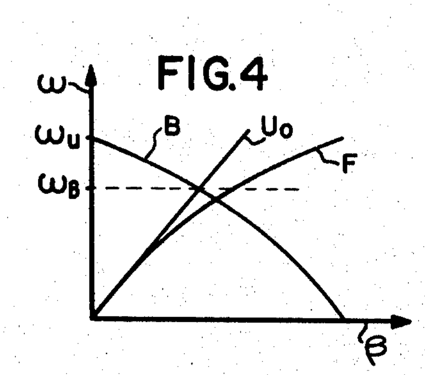
FIG. 4 is an illustrative $\omega-\beta$ diagram of a helix slow wave circuit depicting the lowest order fundamental pass band which is the operating pass band.
Figure 5:
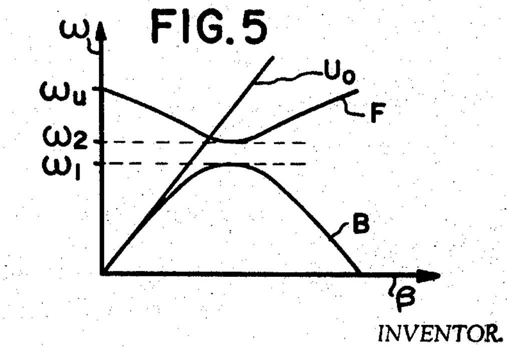
FIG. 5 is an illustrative $\omega-\beta$ diagram of the lowest order fundamental pass band of a helix slow wave circuit having a stop band introduced in the intermediate frequencies of the lowest order fundamental pass band of the helix.

Turning now to the illustrative $\omega$–$\beta$ diagrams depicted in FIGS. 4 and 5, in FIG. 4 there is shown the operating pass band which is generally the lowest order fundamental pass band for a helix circuit such as depicted in FIGS. 1 and 2 without any stop banded regions such as shown in the aforementioned figures. The curve denoted by reference numeral $U_0$ represents the operating beam velocity. The curve denoted by reference numeral B represents the lowest order fundamental backward wave space harmonic branch for the slow wave circuit while the curve denoted F represents the lowest order fundemental forward wave space harmonic branch for the slow wave circuit. The portion where $U_0$ intersects B at a frequency corresponding to $\omega\beta$ and $Ka=\frac{1}{2}$ is the region where backward wave oscillations are particularly troublesome. Obviously, if $U_0$ is increased or decreased, the frequency where backward wave oscillations are prevalent will vary accordingly. $\omega\mu$ Signifies the upper band edge region of the lowest order pass band characteristic for the slow wave circuit. Since the slow wave circuits depicted in FIGS. 1 and 2 are adapted and arranged to function in a forward wave amplifier device, any oscillations occurring at a backward wave oscillation frequency are highly undesirable and as best seen in FIG. 5 the introduction of a stop band banded region between $\omega_1$ and $\omega_2$ utilizing the notched techniques depicted in FIG. 1 and FIG. 2 will successfully minimize backward wave oscillations. However, theoretical analysis indicates that the introduction of the stop band results in the perturbation of the pass band of the circuit such that distinct band edges exist for the stop band which means that the beam characteristic $U_0$ can intersect with a band edge portion of the stop band, such as the upper band edge as shown in FIG. 5 at $\omega_2$. Thus it is seen that the solution for eliminating backward wave oscillations presented by the prior art and as embodied in FIG. 1 has the undesirable effect of introducing a band edge oscillation problem as previously explained. The present invention as depicted in the embodiment of FIG. 2 eliminates this band edge oscillation problem by restricting the stop banded region to only a portion of the total active circuit length of the slow wave circuit. This effectively increases the starting current for backward wave and band edge oscillations by a factor which renders them practically speaking impossible to excite with conventional operating beam currents. Although the oscillation suppression techniques of the present invention have been discussed in connection with a helix interaction circuit, it is quite obvious that the oscillation suppression techniques of the present invention are equally advantageously applied to other slow wave circuits within the broad framework discussed above.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A high frequency electron discharge device having an elongated axis along which an electron beam travels in energy exchange relationship with an electromagnetic traveling wave over at least a portion of the axial extent of said device, said device including a beam forming and projecting means disposed at the upstream portion of said device and a slow wave interaction circuit disposed along the device axis downstream from said electron beam forming and projecting means, said slow wave circuit including a localized portion having perturbation means distributed therealong for introducing a stop band within the operating passband of said slow wave circuit, the remaining portions of said slow wave circuit having no such perturbation means.

2. The device defined in claim 1 wherein said localized portion includes an impedance tapered transition portion.

3. The device defined in claim 1 wherein said slow wave interaction circuit is a helix and wherein said perturbation means is a plurality of discrete areas of non-uniform cross-section on said helix, said areas being spaced apart ½ an electrical wavelength at a frequency within said operating passband where backward wave oscillations occur within said device due to cumulative interaction between a backward wave space harmonic and the electron beam generated by said beam forming and projecting means.

4. The device defined in claim 3 wherein each of said discrete areas of non-uniform cross-section lie along a path having the form of a spiral, and the pitch of said spiral is different than the pitch of said helix.

5. The device defined in claim 1 wherein said perturbation means for introducing said stop band in said operating passband includes a middle portion and end portions disposed on either side of said middle portion with the middle portion of said perturbation means introducing a greater impedance discontinuity than the impedance discontinuity presented at the end portions thereof with respect to electromagnetic energy propagating on said slow wave circuit.

6. The device defined in claim 1 wherein said localized portion is positioned at substantially the center of the slow wave interaction circuit and is disposed over a plurality of periodic lengths of said slow wave interaction circuit on either side of said center.

7. The device defined in claim 1 wherein said device is adapted and arranged to function as a forward wave traveling wave amplifier and wherein said perturbation means is adapted and arranged to introduce a stop band within the operating passband of said slow wave interaction circuit at a frequency centered at the point of synchronization between the electron beam velocity and the phase velocity of the lowest order fundamental backward space harmonic of said slow wave interaction circuit.

8. The device according to claim 1 wherein said slow wave circuit comprises a helically formed conductor and wherein said perturbation means comprises a plurality of periodically spaced areas of reduced cross section on said conductor.

9. The device according to claim 8 wherein said perturbation means comprises a plurality of periodically spaced notches formed in said conductor, said notches being of greatest depth at the center of said localized portion and having a uniformly tapered depth in the region between said center and the ends of said localized portion.

10. A high frequency linear beam electron discharge device having an elongated axis along which an electron beam travels in energy exchange relationship with an electromagnetic traveling wave over at least a portion of the axial extent of said device, said device including a beam forming and projecting means disposed at the upstream end portion of said device, and a slow wave interaction circuit disposed along the device axis downstream from said electron beam forming and projecting means, said slow wave interaction circuit comprising a conductor formed in the shape of a helix, a central portion of said helix having a plurality of periodically spaced notches formed in said conductor, all other portions of said helix being of uniform cross section, said notches being of greatest depth at the center of said helix and having a uniformly tapered depth in the region between said center and the ends of said central portion.

References Cited

UNITED STATES PATENTS

| | | | |
|---|---|---|---|
| 2,773,213 | 12/1956 | Dodds | 315—3.6 |
| 2,822,501 | 2/1958 | Poulter | 315—3.5 |
| 2,828,440 | 3/1958 | Dodds et al. | 315—3.6 |
| 2,941,112 | 6/1960 | Webber | 315—3.5 |
| 3,200,286 | 8/1965 | Rorden | 333—31 X |

HERMAN KARL SAALBACH, *Primary Examiner.*

S. CHATMON, Jr., *Assistant Examiner.*